Patented May 6, 1924.

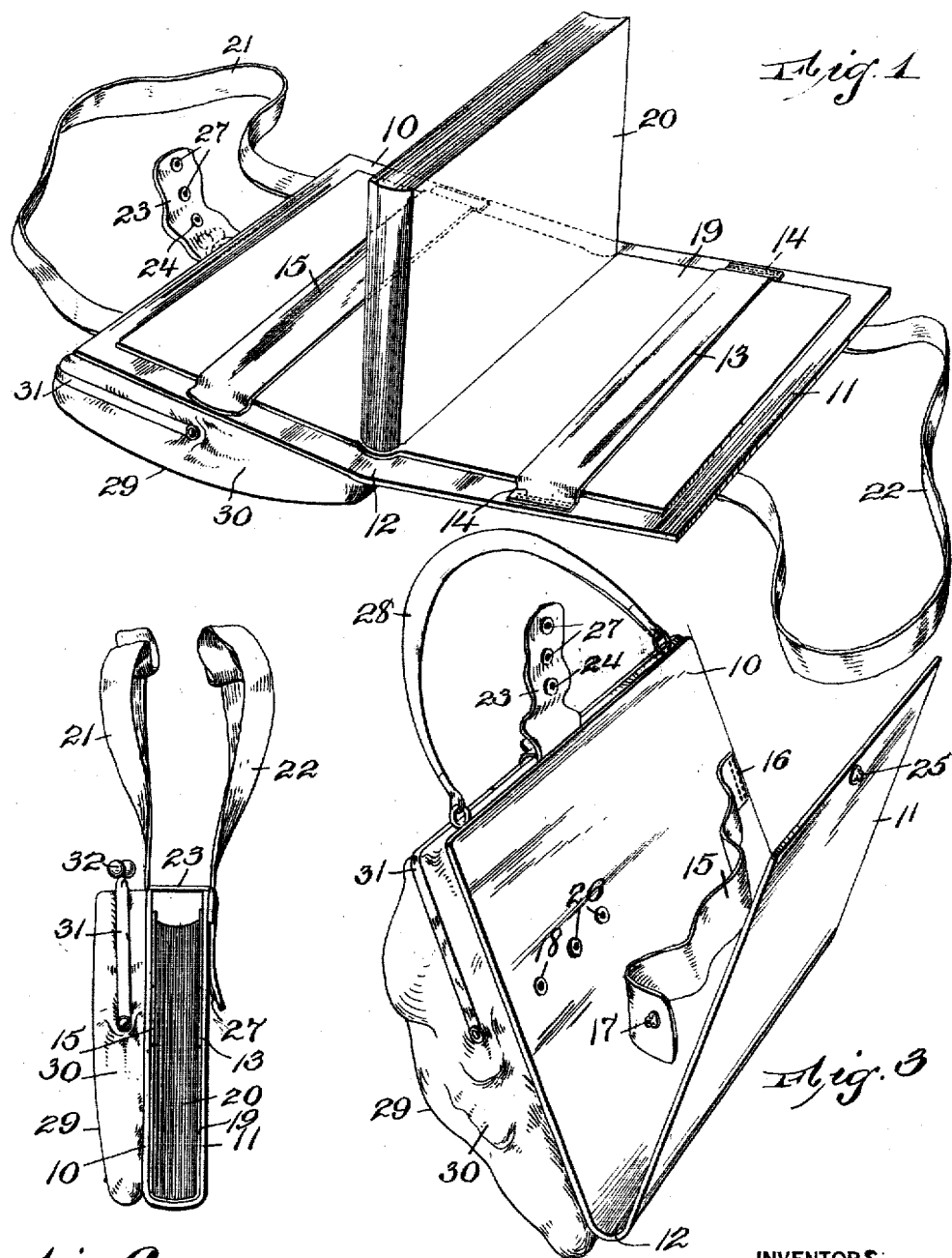

1,492,677

UNITED STATES PATENT OFFICE.

PATRICK J. DUNBAR, OF NEWARK, NEW JERSEY, AND GEORGE STULTZ, OF BROOKLYN, NEW YORK, ASSIGNORS OF ONE-THIRD TO JOSEPH DESCH, OF EAST ORANGE, NEW JERSEY.

CARRIER.

Application filed November 14, 1922. Serial No. 600,872.

*To all whom it may concern:*

Be it known that we, PATRICK J. DUNBAR and GEORGE STULTZ, citizens of the United States, and residents of Newark, county of Essex, and State of New Jersey, and Brooklyn, county of Kings, and State of New York, respectively, have invented certain new and useful Improvements in Carriers, of which the following is a specification.

This invention relates to an improved carrier and is adapted to serve for holding a book so that the book is kept covered and thus kept clean and safe from injury, and also one in which the book is less apt to be lost, the carrier being also adapted for use in carrying light parcels.

The invention is further designed to provide a carrier which combines a hand bag with the carrier above described so as to combine them in one article, the carrier comprising leaves, one of which leaves serves as a back for the hand bag, which is arranged on the outside of the leaf and is adapted to receive the book when it is desired to cover or conceal it.

The invention further consists in certain details of construction to be hereinafter more fully described and finally embodied in the claims.

The invention is illustrated in the accompanying drawing, in which Figure 1 is a perspective view of a carrier made according to our invention, showing it in open position. Figure 2 is an end view of the carrier shown in Figure 1, the carrier being shown closed, and Figure 3 is a view of the carrier partly open and with one of the strips on the inside of the leaves shown detached, the form of handle and the form of hand bag being modifications of those shown in Figures 1 and 2.

The carrier comprises a pair of leaves 10 and 11 which are connected together in swinging relation, this being done usually by hinging them, and in the form shown the hinged part is indicated at 12. When made of leather, such leaves and the hinged part are integral and the flexibility of the material permits this hinged relation. If desired, if made of canvas or other material, stiffening plates can be inserted in the leaves, as will be understood.

The carrier is adapted to hold a book, and for this purpose we provide strips on the inner faces of the leaves, one of the strips 13 being usually secured at its ends permanently in position, as by means of the stitching 14, suitable flexible material such as leather or canvas being used for the strips. A companion strip 15 is on the inner face of the other leaf, but this strip is preferably detachable at least at one end, and in the form shown we show one end permanently attached, as at 16, and the other end is detachable, and in the form shown it comprises the ordinary commercial snap, the male member being shown at 17 on the inner face of the strip, which member fits into the female member 18 placed on the inner face of the leaf 10 near the edge thereof, so that the strip 15, when the snap is caught, is substantially taut, as shown in Figure 1.

These strips hold the cover of a book, the leaves of the cover being embraced and held against the inner faces of the leaves of the carrier by these strips, one leaf of the book cover, as 19, being slid under the strip 13 edgewise, and then the strip 15 is fastened in position when the center of the book is at the hinged part 12 of the carrier. In Figure 1 the leaves of the book, indicated at 20, are shown raised, this being done to facilitate the showing of the strips.

To provide for an automatic closing of the book and of the carrier when it is being carried, we preferably provide a handle made of two members, one member, shown at 21, being secured to the free end of one leaf, and the other member 22 being secured to the free end of the other leaf, so that when they are grasped in the hands the leaves will be held together, as will be evident from Figure 2.

We may, however, provide for holding the leaves together when they are not so carried, and for this purpose we arrange the tab 23, the snap member 24 of which can be joined to the snap member 25 and the leaves thus held in closed position.

If the carrier is to be used in shopping and is to carry a small package not flat like a book, it can be held by the strip 15, which in that case would require adjustment, and for this purpose we arrange the female member 26 of an ordinary snap, into which the member 17 can be snapped. In this case the leaves can not be placed so close together, that is, in parallel relation, as when carrying a book, and for this purpose we arrange additional snap members 27 which can be snapped over the member 25 according to the distance apart the free ends of the leaves are when enclosing a small package. If desired, when this tab 23 is used, a handle made of but one member, as at 28, can be employed, this handle being fastened to the leaf 10.

To the outer face of one of the leaves we secure a hand bag 29, which can be of any usual form, the form we show comprising one with the body portion 30 and the frame 31 with any ordinary form of catch 32, the hand bag being permanently and fixedly secured to the carrier, since the leaf to which it is secured, in the drawing this being the leaf 10, forms the back of the hand bag. The hand bag is substantially the size of the leaf to which it is secured so that in wet weather or for any other reason the book is to be covered it can be placed in the bag.

This carrier is particularly adapted for use by travelers and commuters, and permits anyone in the habit of reading a book while so traveling to guard against loss of the book or of the hand bag, since they are practically one article and can not be separated. Without such carrier it is necessary to carry the book under the arm and, while reading the book, to lay the hand bag down, which may often result in the loss of the hand bag, and on the other hand, when the hand bag is being used the book is apt to be mislaid. With this carrier the book is not only kept clean, but it is easily opened so as to be read, and while the person reading is absorbed in the book there is no chance of losing the hand bag.

After reading, all that is necessary when one is in a hurry is to grasp the handle members in the form shown in Figure 1, and not only is the hand bag lifted, but the book and its carrier are closed, and then at leisure the tab 23 can be snapped shut.

We claim:

1. A carrier comprising a pair of leaves connected together in swinging relation, and strips on the inside of the leaves and adapted to receive the front and back covers of a book and hold them against the inner faces of said leaves, one of said strips being secured at one end to one end of its leaf and being attachable at various spaced intervals from the other end of the leaf.

2. A carrier comprising a pair of leaves connected together in swinging relation, strips on the inside of the leaves and adapted to receive the front and back covers of a book and hold them against the inner faces of said leaves, one of said strips being secured at one end to one end of its leaf and being attachable at various spaced intervals from the other end of the leaf, and a flap on the free end of one leaf and adapted to extend over the outside of the other leaf and having means for attaching it to said other leaf to permit holding the leaves at various partly open positions.

In testimony that we claim the foregoing, we have hereto set our hands, this 10th day of November, 1922.

PATRICK J. DUNBAR.
GEORGE STULTZ.